United States Patent
Ramstein et al.

(10) Patent No.: US 8,174,512 B2
(45) Date of Patent: May 8, 2012

(54) HYBRID HAPTIC DEVICE UTILIZING MECHANICAL AND PROGRAMMABLE HAPTIC EFFECTS

(75) Inventors: Christophe Ramstein, San Francisco, CA (US); Greg Tashjian, Campbell, CA (US); Danny A. Grant, Montreal (CA)

(73) Assignee: Immersion Corporation, San Jose, CA (US)

( * ) Notice: Subject to any disclaimer, the term of this patent is extended or adjusted under 35 U.S.C. 154(b) by 740 days.

(21) Appl. No.: 11/479,743

(22) Filed: Jun. 30, 2006

(65) Prior Publication Data

US 2007/0279401 A1   Dec. 6, 2007

Related U.S. Application Data

(60) Provisional application No. 60/810,455, filed on Jun. 2, 2006.

(51) Int. Cl.
  *G06F 3/033* (2006.01)
  *G06F 3/01* (2006.01)
(52) U.S. Cl. .......................... 345/184; 715/701
(58) Field of Classification Search .................. 345/156, 345/163–164, 167, 184; 463/37; 715/701–702
  See application file for complete search history.

(56) References Cited

U.S. PATENT DOCUMENTS

| | | | |
|---|---|---|---|
| 4,050,265 A | 9/1977 | Drennen et al. | |
| 4,131,033 A | 12/1978 | Wright et al. | |
| 4,652,805 A | 3/1987 | Kohn | |
| 4,706,294 A | 11/1987 | Ouchida | |
| 4,794,388 A | 12/1988 | Matthews | |
| 4,859,922 A | 8/1989 | Tauchenitz et al. | |
| 4,943,866 A | 7/1990 | Barker et al. | |
| 4,947,097 A | 8/1990 | Tao | |
| 5,138,154 A | 8/1992 | Hotelling | |
| 5,185,561 A | 2/1993 | Good et al. | |
| 5,189,355 A * | 2/1993 | Larkins et al. | 318/685 |
| 5,191,320 A | 3/1993 | MacKay | |
| 5,204,600 A | 4/1993 | Kahkoska | |

(Continued)

FOREIGN PATENT DOCUMENTS

DE     35 24 439     1/1987

(Continued)

OTHER PUBLICATIONS

International Search Report, PCT/US 07/013023, dated Dec. 7, 2007.

*Primary Examiner* — Bipin Shalwala
*Assistant Examiner* — Keith Crawley
(74) *Attorney, Agent, or Firm* — Squire Sanders (US) LLP

(57) ABSTRACT

System and method for a rotary control in a device that comprises a knob, a shaft supporting the knob and coupled to rotate therewith a base supporting the shaft. A sensor, operationally coupled to the base, is configured to detect an aspect of manipulation of the knob, which may include information relating to position, velocity, acceleration, torque, rate of rotation, time of rotation, or a combination thereof. A mechanical haptic assembly is operationally coupled between the base and the shaft to provide mechanical based haptic effects in response to movement of the knob with respect to the base. A programmable electronic-based actuator is operationally coupled to the knob and provides electronic-based haptic force feedback to the knob.

21 Claims, 11 Drawing Sheets

U.S. PATENT DOCUMENTS

| | | | |
|---|---|---|---|
| 5,227,594 A | 7/1993 | Russo | |
| 5,254,919 A | 10/1993 | Bridges et al. | |
| 5,261,291 A | 11/1993 | Schoch et al. | |
| 5,270,689 A | 12/1993 | Hermann | |
| 5,381,080 A | 1/1995 | Schnell et al. | |
| 5,414,337 A | 5/1995 | Schuler | |
| 5,627,531 A | 5/1997 | Posso et al. | |
| 5,656,901 A | 8/1997 | Kurita | |
| 5,665,946 A | 9/1997 | Nishijima et al. | |
| 5,712,725 A | 1/1998 | Faltermeier et al. | |
| 5,841,428 A | 11/1998 | Jaeger et al. | |
| 5,889,670 A | 3/1999 | Schuler et al. | |
| 5,944,151 A | 8/1999 | Jakobs et al. | |
| 6,020,875 A | 2/2000 | Moore et al. | |
| 6,088,020 A | 7/2000 | Mor | |
| 6,097,964 A | 8/2000 | Nuovo et al. | |
| 6,100,476 A | 8/2000 | Adamietz et al. | |
| 6,128,006 A | 10/2000 | Rosenberg et al. | |
| 6,154,201 A * | 11/2000 | Levin et al. | 345/184 |
| 6,246,390 B1 | 6/2001 | Rosenberg | |
| 6,283,859 B1 | 9/2001 | Carlson et al. | |
| 6,324,928 B1 | 12/2001 | Hughes | |
| 6,348,772 B1 | 2/2002 | May | |
| 6,480,752 B1 | 11/2002 | Blume et al. | |
| 6,525,711 B1 | 2/2003 | Shaw et al. | |
| 6,591,175 B2 | 7/2003 | Numata et al. | |
| 6,613,997 B2 * | 9/2003 | Oster et al. | 200/564 |
| 6,636,197 B1 | 10/2003 | Goldenberg et al. | |
| 6,809,727 B2 | 10/2004 | Piot et al. | |
| 6,828,957 B2 | 12/2004 | Onodera | |
| 6,879,891 B1 | 4/2005 | Bederna | |
| 6,906,700 B1 | 6/2005 | Armstrong | |
| 6,972,665 B2 | 12/2005 | Wang et al. | |
| 7,643,017 B2 * | 1/2010 | Lai et al. | 345/184 |
| 2003/0128192 A1 | 7/2003 | van Os | |
| 2003/0201979 A1 * | 10/2003 | Sandage et al. | 345/164 |
| 2004/0100440 A1 | 5/2004 | Levin et al. | |
| 2006/0274033 A1 * | 12/2006 | Ruettiger | 345/156 |
| 2007/0188453 A1 * | 8/2007 | O'Sullivan | 345/163 |

FOREIGN PATENT DOCUMENTS

| | | |
|---|---|---|
| EP | 1 182 851 | 2/2002 |
| EP | 1 217 496 | 6/2002 |

* cited by examiner

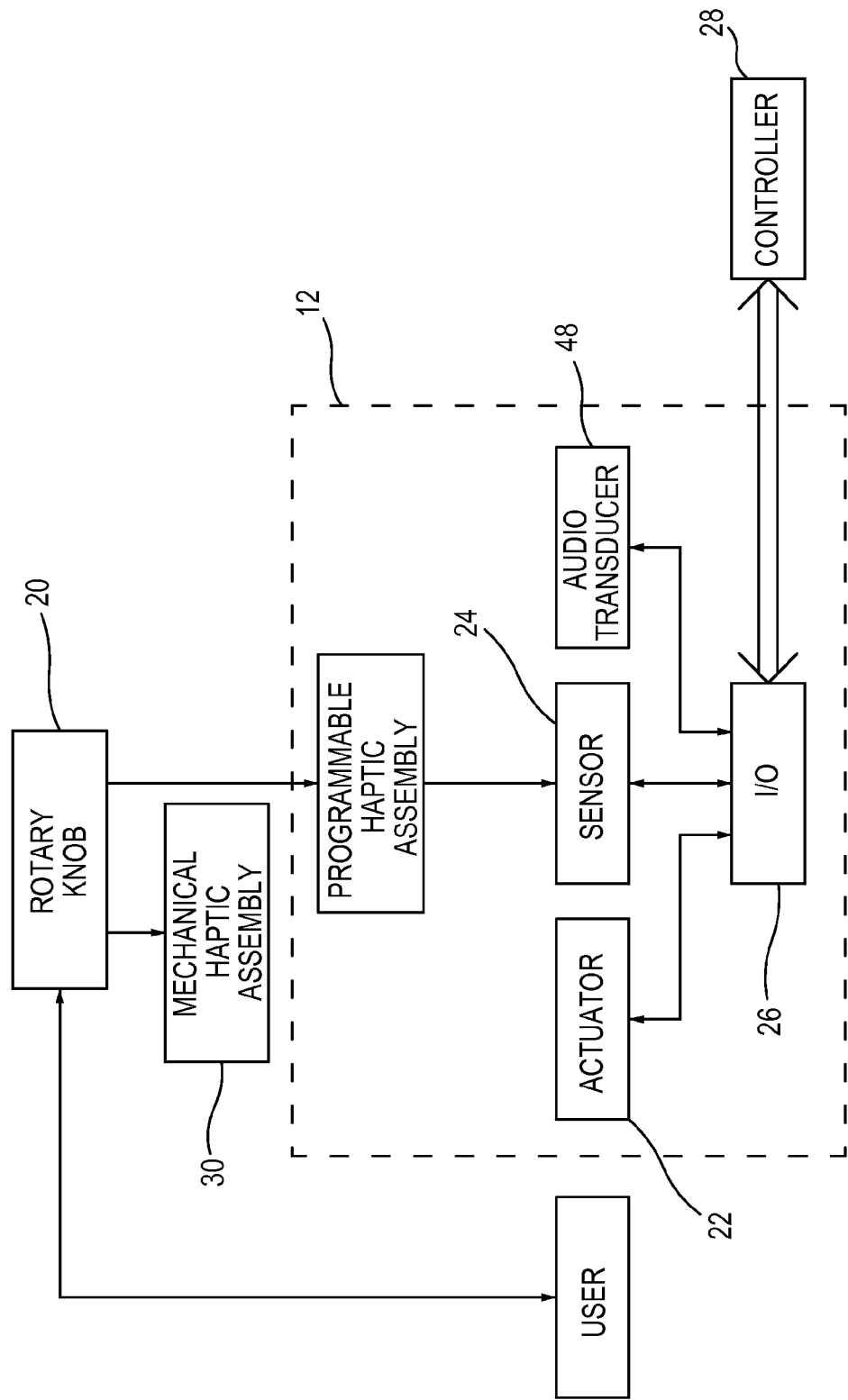

HYBRID HAPTIC DEVICE UTILIZING MECHANICAL AND PROGRAMMABLE HAPTIC EFFECTS

STATEMENT OF RELATED APPLICATIONS

The present application claims the benefit of priority based on U.S. Provisional Patent Application Ser. No. 60/810,455, filed on Jun. 2, 2006, in the name of inventors Christophe Ramstein, Greg Tashjian, and Danny A. Grant entitled "Hybrid Haptic Device."

TECHNICAL FIELD

The subject matter relates generally to input devices that provide haptic force feedback. More specifically, one or more embodiments relate to combining mechanically generated haptic effects with programmable haptic effects and/or electronically generated sounds in a user interface device.

BACKGROUND

Traditional mechanical device controls include switches, knobs, levers and the like. In the past, such controls have been essentially mechanical in nature, e.g., a knob turning a shaft coupled to a potentiometer to control an electrical input to a device such as a radio or audio amplifier, a knob turning a shaft coupled to a fan control or heating/air conditioning control in an automobile, a lever controlling the opening and closing of a vent in an automobile, etc.

With many traditionally mechanical functions being replaced by electronics, operation of electronic controls has been made less intuitive to users. For example, without click-stops or "detents," or otherwise a sense of mechanical resistance, it may be difficult to operate an electronic substitute for traditional mechanical control devices or even obtain a similar experience from such a device.

Programmable haptic devices, such as rotary input control devices allow generation and delivery of a force feedback effect to a user, whereby the programmable haptic devices may mimic the operation of traditional mechanical device controls. In other respects, however, certain programmable haptic devices may lack some of the tactile response characteristics of a conventional mechanical device. For instance, certain programmable haptic device may fall short of electronically re-creating a high quality feel and a high level of realism associated with mechanical-based haptic effects.

In addition, certain purely programmable haptic devices may utilize complex position sensing systems which require significant processing capabilities to produce simple mechanical-like haptic effects. Such purely programmable devices may be relatively expensive and require a significant sampling rate which may further result in delays between moving the device and feeling the haptic effect. Further, a purely programmable haptic device may not produce mechanical-like haptic effects while un-powered.

Accordingly, what is needed is a cost-effective device and method to provide effective haptic effects mechanically and electronically to a user operated device.

SUMMARY

Embodiments relate to methods and systems for combining mechanically generated force profiles with programmable haptics and/or electronically generated sounds at a user interface to provide a rich haptic experience.

In accordance with an embodiment, a rotary control device is formed from a system that comprises a rotatable knob, a shaft supporting the knob and coupled to rotate therewith a base supporting the shaft. A sensor, operationally coupled to the base, is configured to detect an aspect of manipulation of the knob, which may include a position, velocity, acceleration, torque, rate of rotation, time of rotation, or a combination thereof. A mechanical haptic assembly is operationally coupled between the base and the shaft to provide the tactile response of a plurality of mechanical haptic effects such as detents or hard stops in response to rotation of the knob with respect to the base. An actuator operationally coupled to the knob provides haptic force feedback at the knob. In accordance with an embodiment, the knob is further coupled to both of the mechanical haptic assembly and the programmable rotary module so as to force them both to rotate in synchrony with one another.

In accordance with an embodiment, a method for interacting with a rotary input control device comprises rotating the rotary input control device and a coupled mechanical haptic assembly in synchrony with one another. The method also comprises sensing at the rotary input control device an aspect of manipulation of the rotary input control device; and sending from the rotary input control device a signal to a microprocessor that acts as a controller responsive to the sensed aspect of manipulation of the rotary input control device. The method further comprises feeling mechanical haptic effects and programmable effects from an actuator operationally coupled to the rotary input control device. The effects are responsive to the rotation.

In an embodiment, a combination of an encoder, or potentiometer, with an inertial type actuator to create the programmable haptic effect is used. In this embodiment the mechanical feel is generated by the encoder and the programmable haptics are created by sending commands from the controller to the inertial actuator, such as an Eccentric Rotating Mass (ERM) or Linear Resonating Actuator (LRA) in response to a host program. For example when the user is rotating the device, such as a knob, an electronic-based haptic effect may be output to the knob to augment existing mechanically-based haptic effects if they are present. In an embodiment, the inertial actuator may be configured to create a continuous vibration when the user gets to the last item on a list or has turned the knob past a programmed or non-programmed rotational limit setting.

In an embodiment, an encoder, or potentiometer is utilized with a mechanical detent assembly and a means to generate programmable barriers. An embodiment uses a braking actuator for example the PR-1000 by Immersion Corp. In another embodiment, the braking mechanism may include a pin that engages or disengages a slot to create or release the programmable barrier. In an embodiment, the pin may have two or more designated state positions or may be continuously controlled. In addition, there may be one or more pins which are used to create the barriers. When a programmable barrier is desired, a command signal is given to engage the pin into the slot to create a hard stop. Other mechanical arrangements may be used instead of a slot such as a brake pad engaging a friction surface.

In any or all of the embodiments described, the haptic device may include an audio transducer or speaker. An audio transducer may be used to complement the sensations generated by the mechanical assembly and/or the programmable haptic effects. In this fashion, it is possible to create a multi-modal user experience. For example if it is desired to give the user the impression that a detent feels crisp it is possible to output a sharp, or high frequency, sound upon rotating the device to the detent. Another embodiment of the invention involves the use for a microphone to capture the audio signal generated by the hybrid haptic device in real time. In this embodiment it would be possible to modify or filter, the audio signal and then play back the modified audio with the audio transducer, or speaker. For example it would be possible to amplify the audio, or to change the pitch of the audio in order to change the overall user experience of the device.

BRIEF DESCRIPTION OF THE FIGURES

The accompanying drawings, which are incorporated into and constitute a part of this specification, illustrate one or more embodiments and, together with the detailed description, serve to explain the principles and implementations of the subject matter described herein.

In the drawings:

FIG. 6 illustrates a block diagram of a sub-system for providing programmable haptic effects in accordance with an embodiment.

DETAILED DESCRIPTION

Embodiments are described herein in the context of a rotary input control device such as a hybrid haptic device. The hybrid haptic device is configured to output mechanically generated haptics and electronically generated haptics. Further, the hybrid haptic device may produce both mechanical and electronic sounds in combination with the haptics which are generated. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In accordance with the subject matter described herein, the components, systems, devices, process steps, and/or data structures may be manufactured, operated and/or implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising is implemented by a computer, device or a machine and the method may be stored as instructions readable by the machine, they may be stored on a tangible medium such as a computer memory device, including, but not limited to, ROM (Read Only Memory), PROM (Programmable Read Only Memory), EEPROM (Electrically Eraseable Programmable Read Only Memory, FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
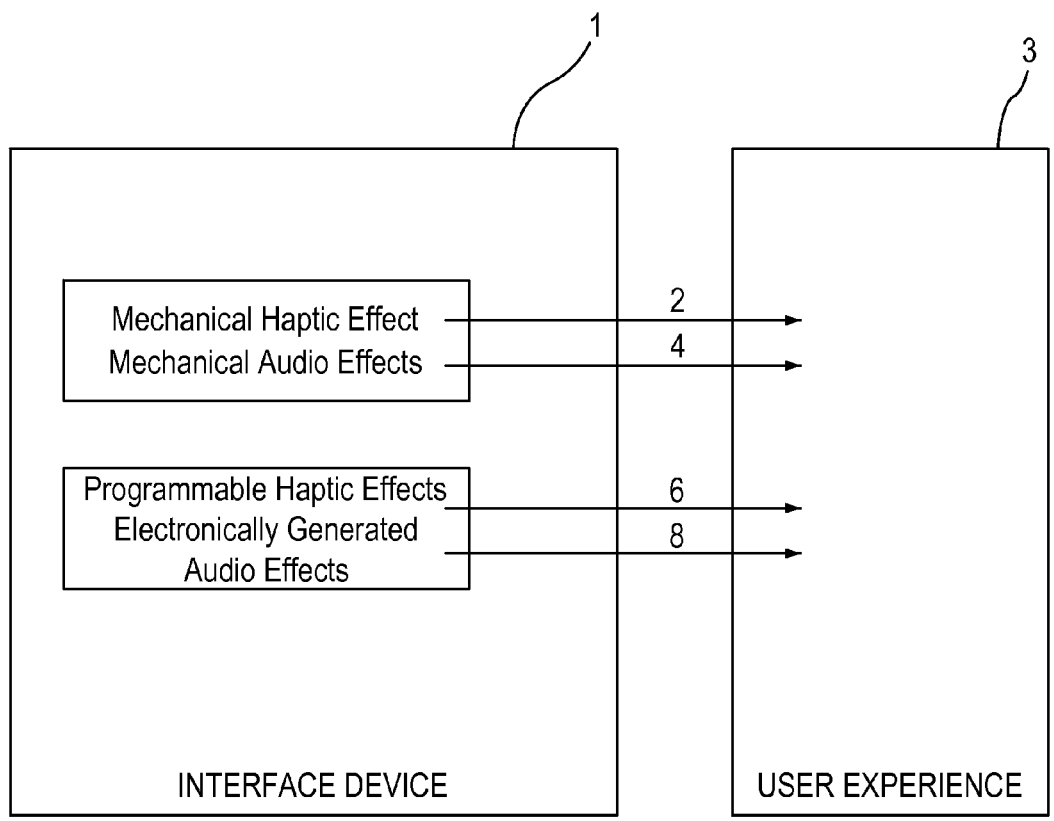
FIG. 1 is a block diagram illustrating multimodal contributions to a user experience in accordance with an embodiment.

FIG. 1 illustrates a general block diagram showing multimodal contributions to user experience in accordance with an embodiment. In particular, FIG. 1 shows an interface device block 1 and a user experience block 3. The interface device block 1 represents the object that the user manipulates as well as the components coupled to the object, which allow the sensing and processing capabilities as well as the generation of haptic effects. The user block 3 represents the manipulation capabilities of the user which operate the object as well as the sensory faculties of the user which receive the audio and/or haptic effect and feedback from the interface device block.

As shown in FIG. 1, the interface device 1 can generate a variety of sensory characteristics which provide the user with a pleasurable and effective haptic experience. In an embodiment, the interface device 1 provides mechanical haptic effects 2 and mechanical audio characteristics 4 to the user 3. Additionally, the interface device can provides programmable haptic effects 6 as well as electronically reproduced audio characteristics 8 to the user 3. For example, in an embodiment, the system may selectively incorporate mechanical haptic effects 2 with programmable haptic effects 6 to the user 3 and optionally include mechanically produced sounds 4 (e.g. clicks or other control-like sounds) and/or electronically produced sounds 8 (e.g. clicks, beeps, tones). The particulars of the system are described herein.

Figure 2:
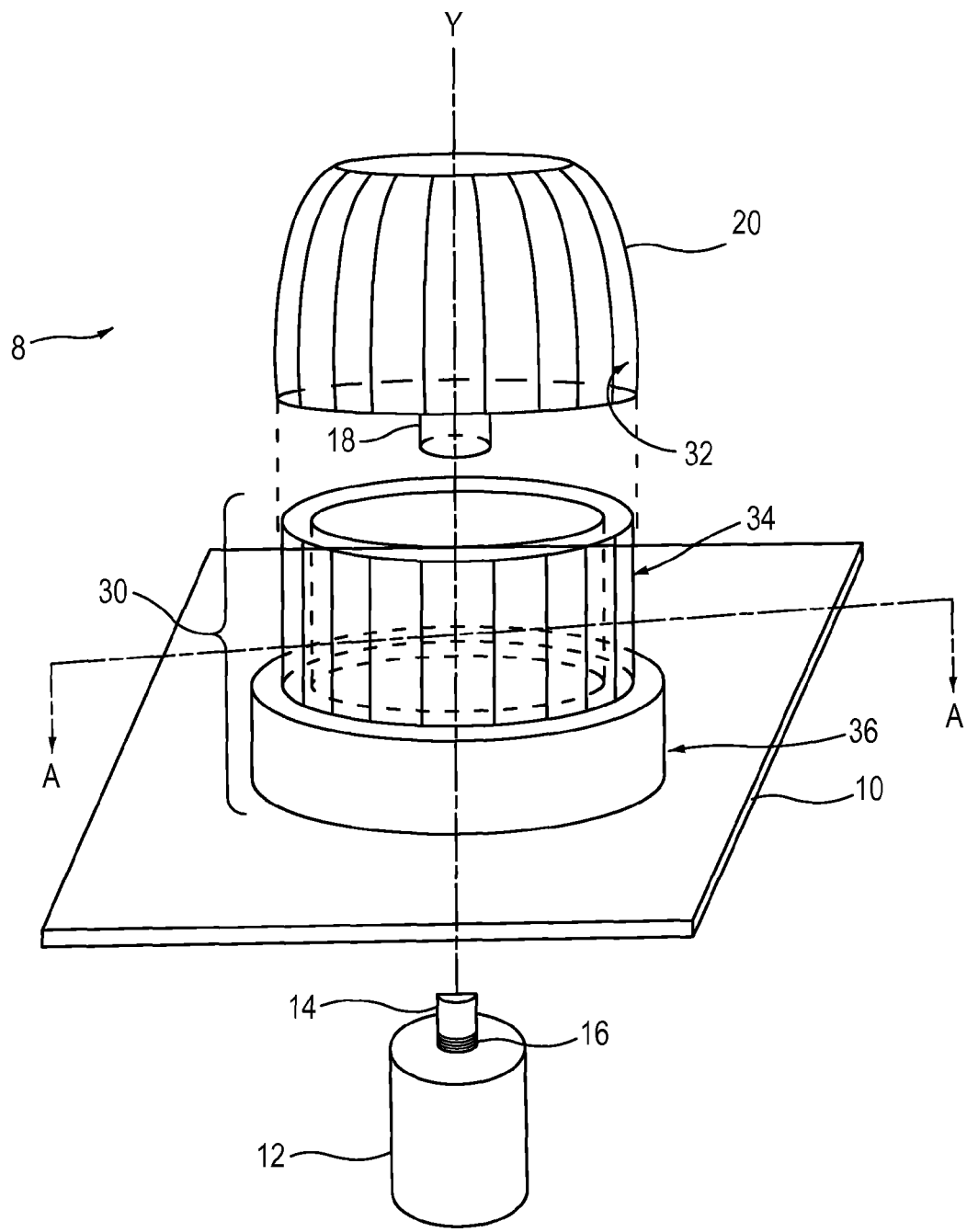
FIG. 2 illustrates an exploded view of a rotary input control device in accordance with an embodiment.

FIG. 2 illustrates an exploded view of an input control device in accordance with an embodiment. In particular, the input control device 8 includes a mechanical haptic assembly as well as an electronic haptic assembly, wherein the device 8 is capable of providing mechanical-based as well as electronic-based haptic effects. It should be noted that the control device described in relation to FIG. 2 is only an illustrative example and is not limited thereto.

In an embodiment, the control device 8 is coupled to a mounting surface 10. The mounting surface may be a surface on a control panel, dashboard, car console, mouse, joystick, industrial equipment, medical equipment or any consumer electronics device. The mounting surface may be part of a mounting structure, whereby the entire mounting structure is installed in a receiving surface such as that described above. In an embodiment, the device 8 includes a mechanical assembly 30 which allows the device 8 to output mechanical haptic effects when rotated. The mechanical assembly 30 comprises a collar 36 as well as an inner sleeve 34, both of which are rotatable about axis Y. In an embodiment, the device 8 includes a knob 20 which fits over the inner sleeve 34 and rotates along with the inner sleeve, as shown in FIG. 2. The device 8 includes a programmable rotary module 12 which is positioned either inside the inner sleeve 34 or under the mounting surface 10. As shown in FIG. 2, the programmable rotary module 12 includes a shaft 14 extending along axis Y which fits into a receiving shaft 18 of the knob 20.

As shown in FIG. 2, the knob 20 is a generally cylindrical object. In other embodiments, the knob 20 may have various designs, including but not limited, to conical shapes, spherical shapes, oval shapes, dials, cubical shapes, rods, etc. In other embodiments, the knob 20 may have one or more textures on its circumferential surface, including but not limited to, bumps, lines, grooves or other grips, or even projections or members extending from the circumferential surface. Such shapes and textures may allow a user to easily grip or contact the knob 20 and rotate it a desired amount.

Figure 3:
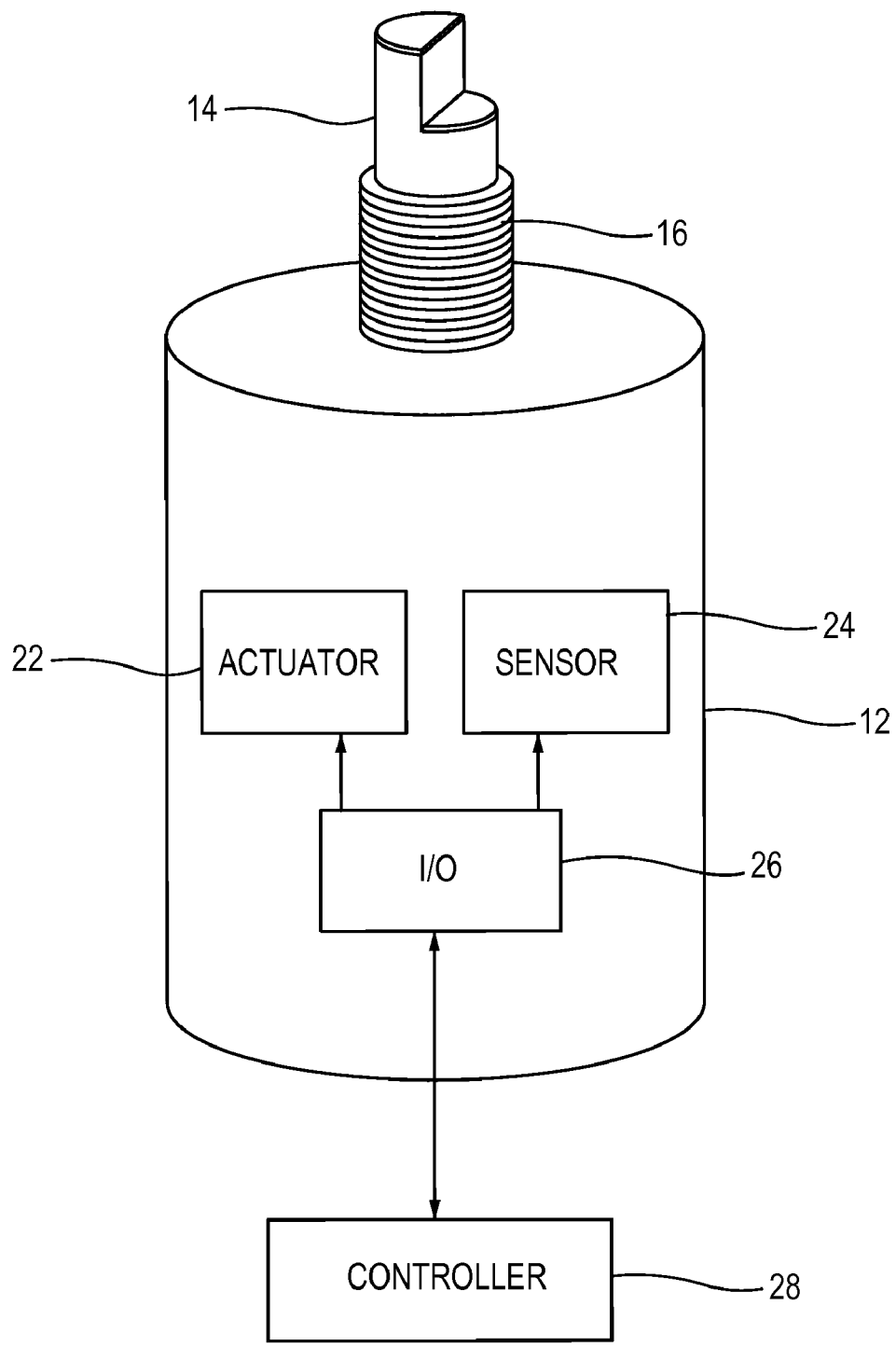
FIG. 3 illustrates a block diagram of a programmable rotary module used in accordance with an embodiment.

FIG. 3 illustrates a programmable rotary module used in accordance with an embodiment. In an embodiment, the programmable rotary module 12 may be a PR-1000, PR-3000, or PR-5000 Touchsense™ Module available from Immersion Corporation of San Jose, Calif. However, other appropriate programmable rotary modules may be used with the device 8 and is not limited to the device described herein.

As shown in FIG. 3, the programmable rotary module 12 includes a body having a shaft 14 protruding from an end surface. In an embodiment, the shaft 14 and body are oriented such that the shaft 14 is positioned along the axis Y (FIG. 2). The shaft 14 includes a threaded portion 16 which allows the programmable rotary module 12 to be secured to the mounting surface 10 as well as the knob 20 in an embodiment. It should be noted, however, that the programmable rotary module 12 may have other securing configurations to allow it to be coupled to the mounting surface 10 as well as the knob 20. In an embodiment shown in FIG. 3, the shaft 14 is optionally keyed at its end to allow keyed coupling to the receiving portion 18 of the knob 20.

As shown in FIG. 3, the programmable rotary module 12 includes one or more sensors 24, one or more actuators 22 and an I/O interface 26 which couples the programmable rotary module 12 to a controller 28. In an embodiment, the one or more sensors measure and encode the position, velocity, acceleration, linear force and/or torque information of the knob 20 to the controller 28. The actuator 22 in the programmable rotary module 12 is configured to output haptic effects to the device 8 upon receiving an appropriate haptic signal from the controller 28. Such haptic effects include, but are not limited to, various rotational resistances, rotational biases, as well as initiating and/or stopping the rotation of the knob 20. As will be described in more detail below, in an embodiment, programmable rotary module 12 operates as a multi-phase motor which may rotate, brake, or set detents and/or hard stops, based on signals received from the controller 28. The I/O interface 26 is configured to facilitate data communication between the programmable rotary module 12 and the controller 28, whereby such data communication is transmitted and/or received using wires or via a wireless technology. In particular, sensor data measured by the sensor 24 is transmitted to controller 28 via the I/O interface 26, and actuator commands sent to the actuator 22 from the controller 28 are passed through the I/O interface 26.

Figure 4:
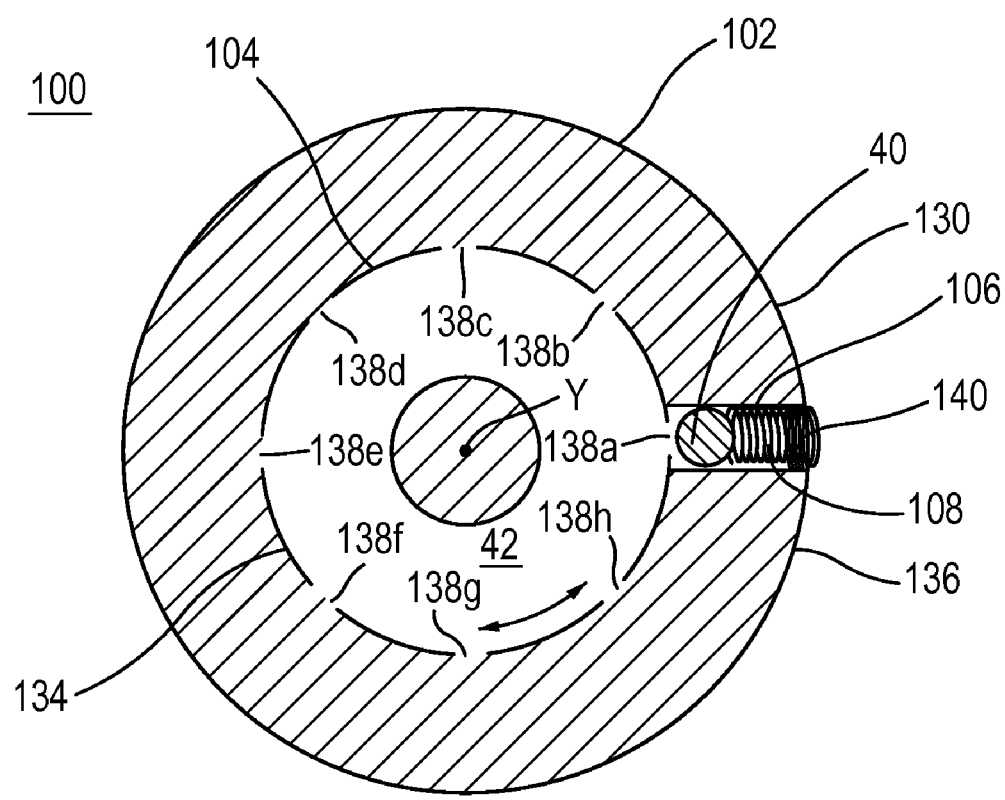
FIG. 4 illustrates a top plan view of a mechanical detent assembly of the rotary input control device in accordance with an embodiment.

FIG. 4 illustrates a cross-sectional view of the collar of the mechanical haptic assembly 100 along line A-A in accordance with an embodiment. In particular, FIG. 4 depicts a collar 136 having a mechanical detent configuration in an embodiment. In an embodiment, the inner sleeve 134 includes one or more physical features which come into contact with one or more physical actuating mechanisms in the collar 136 to produce mechanical-based haptic effects when the knob 20 is rotated. In an embodiment, the physical feature is located on the inner surface 104 of the collar 136, and the physical actuating mechanism is located at the inner sleeve 134 or knob 20 (FIG. 2). In an embodiment, an inner sleeve 134 is not used, whereby the knob 20 is in contact with the collar 136 and the physical features or physical actuating mechanism is located on a portion of the knob 20.

In the embodiment shown in FIG. 4, the collar 136 includes an outer surface 102 and an inner surface 104. In addition, the inner sleeve 134 is shown in contact with the inner surface 104 of the collar 136, whereby the inner sleeve 134 is rotatable with respect to the collar 136 about axis Y. As shown in FIG. 4, the collar 136 includes one or more conduits 106 between the outer surface 102 and the inner surface 104. In an embodiment, a spring loaded mechanism 108 within the conduit 106 is in contact with a ball 40, whereby the spring 108 urges the ball 40 toward the center axis Y. This ball 40 and spring loaded mechanism 108 is only an example of the physical actuating mechanism; however the physical actuating mechanism may be any other appropriate type of configuration.

In the embodiment shown in FIG. 4, the physical features at the inner sleeve 134 are notches shown as reference numerals 138*a*-138*h* in FIG. 4. In the embodiment shown in FIG. 4, the notches 138*a*-138*h* are voids in the outer surface of the inner sleeve 134 and are radially positioned so that the biased ball 40 rides into and out of the notches 138*a*-138*h* as the knob 20, as well as the inner sleeve 134, are rotated about axis Y. Thus, as each of the notches 138 rotate past the biased ball 40, a mechanical haptic effect is felt by the user. The shape and configuration of the notches 138*a*-138*h* shown in FIG. 4, mechanically produce a detent-like haptic effect in the knob 20. In an embodiment, the physical features may be configured to produce other mechanically-based haptic effects as described in more detail below.

Detents may be used to mark fine or coarse increments or selections, and may be customized in size, shape and number to suit context-sensitive requirements. In an embodiment, indentations or recesses are formed into the inner sleeve 134 instead of notches as the physical features. In an embodiment, protrusions extend from the inner sleeve 134 toward the inner surface 104 of the collar 136 such that the protrusions serve as the physical features.

Detent positions formed by the physical features on the outer surface of the inner sleeve 134 may indicate a setting, such as a radio station, television station, or volume. An inherent mechanical feel of a detent might be a jolt or bump, and an inherent mechanical sound a tick or a click or the like. The mechanical feel of the knob 20 may depend upon physical properties of the device 8 including, but not limited to, inertia, friction, number of detents, the stiffness of the detents, shape of the physical features which form the detents, dimensions of the physical features, width of the detents, location of the center of the detents, range of motion, range of barriers (e.g. start and stop), weight of the components and frictional forces present in the device 8.

In an embodiment, the mechanical haptic assembly 30 includes a potentiometer incorporated therein which supplements or replaces the sensor 24 in the rotary module 12. The potentiometer senses movement of the knob 20 rotationally and/or transversely and provides information relating to position, velocity and acceleration to the controller. Such a potentiometer device is available, for example, as part number EVQ-WFP00415B manufactured by Panasonic Corporation.

Figure 5:
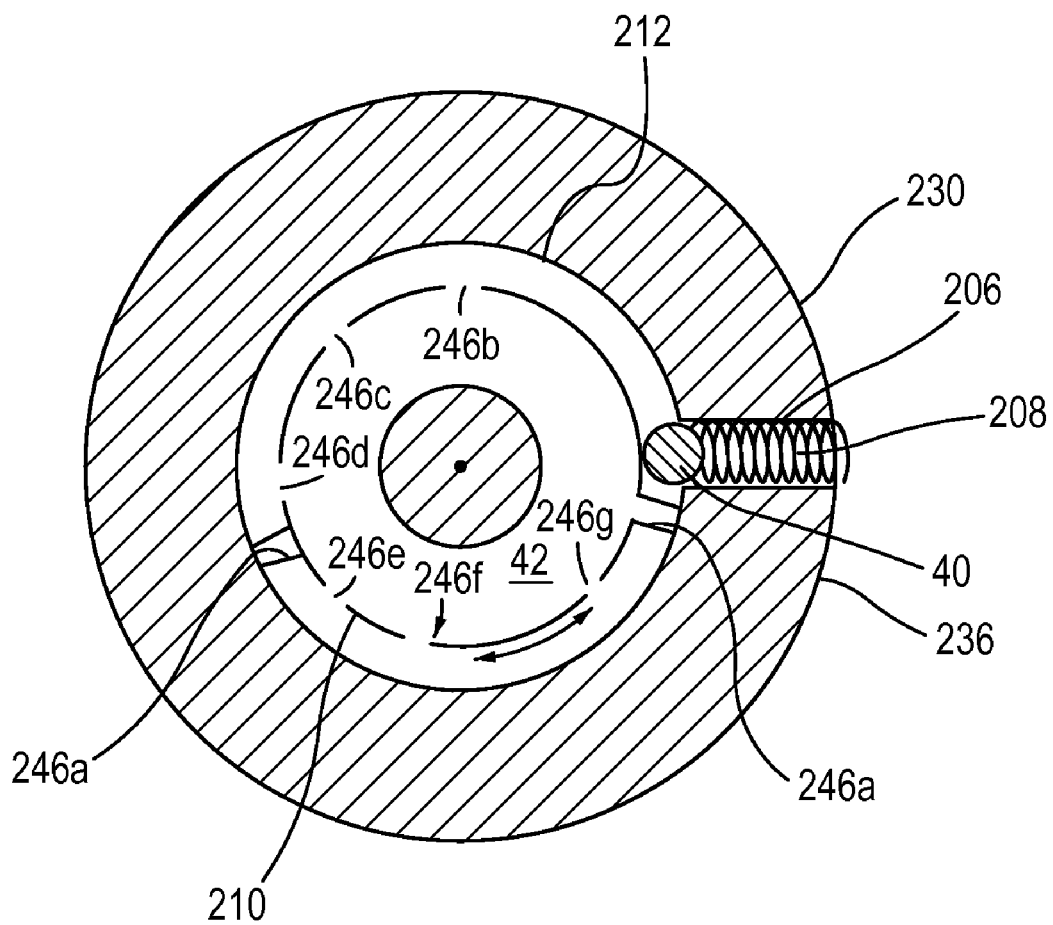
FIG. 5 illustrates a top plan view of a hard-stop assembly of the rotary input device in accordance with an embodiment.

FIG. 5 illustrates a top plan view of a hard-stop assembly in accordance with an embodiment. Hard stops restrict the user's motion, and are useful for indicating, such as, for example, first and last items, minimums and maximums, or an edge of an area (e.g. radio band). FIG. 5 depicts a mechanical haptic assembly 230 that includes a physical feature which represents a hard stop 246a haptic effect as well as other physical features which represent detent haptic effects 246b-246g. As shown in FIG. 5, the inner sleeve 210 is rotatable about axis Y and has a diameter which is smaller than the diameter of the inner surface 212 of the collar 236. In addition, the detent features 246b-246g are along the surface of the inner sleeve 210. The hard stop feature 246a is shown in FIG. 5 to protrude from the outer surface of the inner sleeve 210 and comes into contact with the ball 40 when the knob is rotated to the hard stop. Thus, the hard stops 246a serves to provide a strong resistance to further rotation of the knob 20, thereby indicating to the user that hard stop has been reached. It should be noted that the hard stop feature 246a need not protrude all the way to the inner surface 212 as shown in FIG. 5. The feature 246a may protrude only part of the way and serve as a soft stop that provides some resistance to the user which may thereby be overcome by applying enough torque to the knob 20. In an embodiment, more than one of the hard stop, soft stop or a combination may be configured and be placed at any degree angle with respect to axis Y.

In an embodiment, the device 8 is able to completely turn off the electronic based haptic effects and thus allow only the mechanically-based haptic effects to be felt by the user when the knob 20 is manipulated. In such an embodiment, the controller 28 instructs the rotary module 12 to allow the shaft to freely rotate about axis Y. However, the device 8 may be configured to selectively deactivate the mechanically-based haptic effects such that the user is unable to feel the mechanical haptic effects when manipulating the knob 20. In such an embodiment, the collar 136 may include an electromechanical switch which, once activated, causes the mechanical actuating mechanism to no longer contact the inner sleeve 134 or knob 20. In an embodiment, the collar 136 may include a magnet 140 in the conduit 106. Once the magnet 140 is energized, the magnetic forces will cause the spring 108 and the ball 40 to be attracted to the magnet 140 and thus move into the conduit 106 and away from the inner sleeve 134. The ball 40 would thereby no longer be in contact with the inner sleeve 134 and would allow the inner sleeve 134 and knob 20 to rotate about the axis Y without producing any mechanically based haptic effects. It should be noted that the configuration with the magnet 140 is only one example, and any other appropriate design may be implemented to deactivate the mechanically based haptic effects onto the knob 20.

In an embodiment, the collar 136 is removable from the mounting surface 10 to allow another collar 136 to be installed to the device 8 to allow ease of manufacturability. For example, the collar 136 shown in FIG. 4 may be easily substituted with the collar 236 in FIG. 5 for different applications without the need of using other parts or components.

FIG. 6 illustrates a block diagram illustrating the various components of the system utilizing the device in accordance with an embodiment. In the embodiment shown, sensor 24 may be one of several sensing devices known in the art, including but not limited to, an optical shaft encoder, Hall effect sensor, potentiometer and electroactive polymer. The sensor 24 provides information regarding aspects of the user's manipulation of the knob 20, whereby such information may include, but not be limited to, a rotation of the knob 20, torque applied to or by the knob 20, rotary position attained by the knob 20, time at which the knob 20 is rotated as well as velocity and acceleration information. The sensor 24 sends an output signal containing some or all of this information to the controller 28 via the I/O communications block 26.

The actuator 22 and audio transducer 48 receive output signals from the controller 28 and generate the corresponding haptic and audio effects. The audio transducer 48 may be implemented using a speaker or other audio or tone emanating device. The actuator 22 may be any of a number of actuators known in the art including but not limited to motors, electromagnetic brakes, Eccentric Rotating Mass actuators (ERM), electroactive polymers, linear resonating actuators, magnetic particle brakes, or magneto-rheologic or electro-rheologic brakes utilizing a magnetic core, a coil or a magnetic target. These actuators 22 may be powered by an inertial mechanism, a direct-drive mechanism, or a vibration mechanism.

The controller 28 controls the application of the programmable haptic and audio effects. In particular, the controller 28 receives sensor information from the sensor 24 and outputs signals to the programmable rotary module 12 to output selected haptic effects to the user based on the sensed position and instructions from a host application program run by the controller 28. The controller 28 optionally outputs a digital audio component to the programmable rotary module 12 which may be responsive to the information contained in the signal received from the sensor 24.

The controller 28 may comprise one or more microprocessors, for example, digital local processors capable of processing input, executing algorithms, and generating output as necessary to create the desired haptic effects to the actuator. In an embodiment, the controller 28 may be a local or remote host computer which processes software code running on an application program and utilizes the sensor signals in context of the software program to output appropriate haptic signals to the actuator 22 in the device 8.

In accordance with an embodiment, the controller 28 looks up the aspect of user manipulation in a table stored in a memory and outputs a signal having a haptic component and/or an audio component to the actuator 22 and/or audio transducer 48. In an embodiment, the controller 28 uses algorithms or a combination of algorithms as well as look-up tables stored in a memory to generate the haptic component and/or audio component.

Controller 28 may factor information concerning the mechanical haptic assembly into the algorithms and/or look-up tables so that the programmable haptic effects and audio effects complement the mechanical feel of the rotary control device 8 (FIG. 2). In particular, the controller 28 would utilize sensor information from the mechanical haptic assembly to factor in this information. Such mechanical haptic assembly information may include the number of mechanical detents, the widths of the detents, the location of the center of the detents, the range of motion, the specific detent profile, the friction forces present, the location in a profile where audio is tone generated and the like.

In an embodiment, the controller 28 generates the output signal while the knob 20 is positioned at a detent in the mechanical haptic assembly 30. In an embodiment, the output signal sent from the controller 28 may be responsive, at least in part, to a specific detent in which the knob 20 is positioned. The device 8 is thus able to output a haptic effect which corresponds to the specific position of the knob 20, whereby the position may be provided by sensing capabilities in the mechanical and/or electronic haptic assembly. For example, if the detent indicates a slow windshield wiper setting, the output signal might represent smaller or slower vibrations and lower volume sounds. If the detent indicates a faster windshield wiper setting, the output signal might represent faster or larger vibrations and louder sounds.

As described above, the device 8 described herein is configured to provide mechanically-based haptic effects as well as programmable, electronic-based haptic effects. In particular, the programmable electronic-based haptics are supplied by the programmable rotary module 12 to augment the mechanical-based haptics from the mechanical-based haptic assembly. In an embodiment, the programmable rotary module 12 overlays programmable electronic-based force profiles on the mechanical-based haptic effects, as will be discussed in more detail below.

For example, the programmable rotary module 12 outputs resistive or active feedback in addition the mechanical-based haptic effects. A "resistive" feedback haptic effect increases the amount of force required, even to a value of infinity, by the user to move the knob 20. For example, programmable friction or damping effects may be used to augment or reduce ease of movement of the knob 20. An "active" feedback haptic effect decreases the amount of force required by the user to move the knob. Programmable haptic effects may assist the user in rotating the knob, by actively supplying torque to the device. With certain haptic effect modules it is also possible to cause rotation of the knob 20 as a haptic effect under control of the controller 28.

Programmable haptic effects may also provide transient (temporary) effects. For example, vibrations output by the rotary module 12 may indicate an entrance to, departure from, or given position of a mechanical-based haptic effect. Likewise, programmable audio effects may be played by the audio transducer or other device to indicate the same. Sounds may also be used to simulate the nature of various materials (e.g., aluminum, plastic).

FIGS. 7A-7H each illustrate examples of programmable haptic effect profiles useable with one or more various embodiments. In FIGS. 7A-7H, the knob 20 is shown on the right along with a representation of the haptic effect profile corresponding to the knob 20 shown on the left. It should be noted that the following haptic effect profiles are merely examples and that the device 8 may be configured to output other haptic effect profiles not specifically described. It should be noted that the device 8 may output a combination of two or more of the haptic effect profiles based on the application.

Figure 7A:
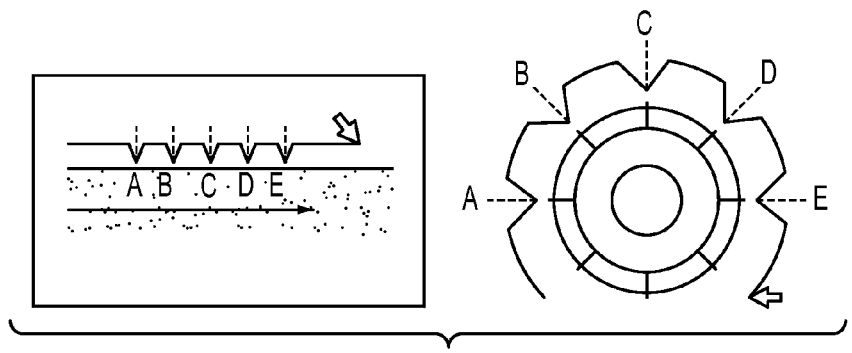
FIGS. 7A-7H each illustrate examples of programmable haptic effect profiles useable with one or more embodiments.

FIG. 7A depicts a programmable detent effect in accordance with an embodiment. As shown in FIG. 7A, programmable detents A-E may emulate the feel and function of detents. Programmable detents may be added to complement existing mechanical detents or to further sub-divide existing mechanically-based detents. The magnitude, width, or overall feel of the resistive force applied to the knob 20 at each electronic-based detent may be programmed to be substantially similar to the force applied to the knob by the mechanical haptic assembly. In an embodiment, the magnitude, width, or overall feel of the resistive force applied to the knob 20 at each electronic-based detent may be programmed to be greater or lesser than the force applied to the knob by the mechanical haptic assembly to differentiate the electronic-based detents from the mechanical-based detents.

Figure 7B:
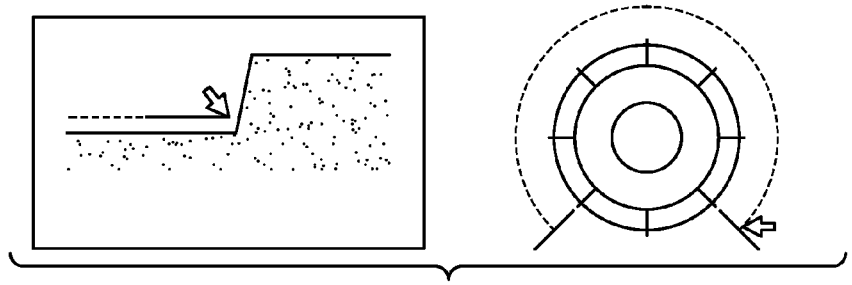

FIG. 7B depicts a programmable hard stop force effect profile (also referred to as a programmable barrier) in accordance with an embodiment. Programmable hard stops may be used to emulate the feel and function of mechanical hard stops, and may be selectively output by the device 8 based on the application of the device 8. Programmable hard stops may be used to complement an existing mechanical haptic assembly which has one or more mechanical hard stops. As described below, the programmable hard stops may be used to selectively produce hard stops that are configured in the mechanical haptic assembly.

Figure 7C:
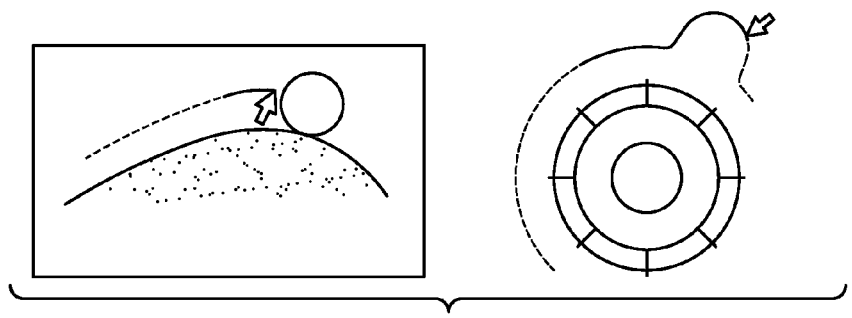

FIG. 7C depicts a programmable hill effect profile in accordance with an embodiment. A hill is a plateau style of wide detent. A hill effect could be used for menu wrap-around features as well as informing the user that he or she has moved from a last menu item to a first menu item. The hill effect may also be used to indicate a return from a sub-menu back to the main menu or to signal the crossing of a boundary. The hill effect profile may be output by the actuator 22 upon receiving a corresponding output signal from the controller 28 based on the sensed position of the knob 20.

Figure 7D:
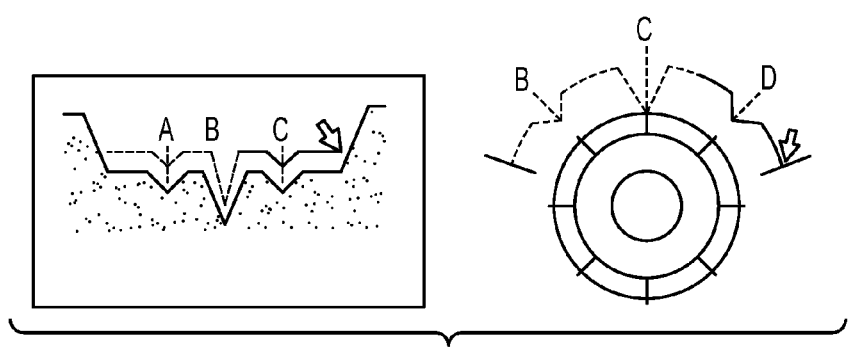

FIG. 7D depicts a programmable compound effect in accordance with an embodiment. A compound effect includes two or more effects such as barriers and detents. Compound effects help designers to closely match tactile sensations to operational steps, which may enhance usability. For the example shown in FIG. 7D, the compound effect, which would be appropriate for Fade Control on a car stereo, may include small detents (shown as "A" and "C") with a deeper center detent (shown as "B") and barriers on each end. In an embodiment, the deeper center detent B is output only by the rotary module 12 whereas the smaller detents A, C are output by the mechanical haptic assembly. In an embodiment, all detents A-C are output by the rotary module 12. The compound effect profile may be output by the actuator 22 upon receiving a corresponding output signal from the controller 28 based on the sensed position of the knob 20.

Figure 7E:
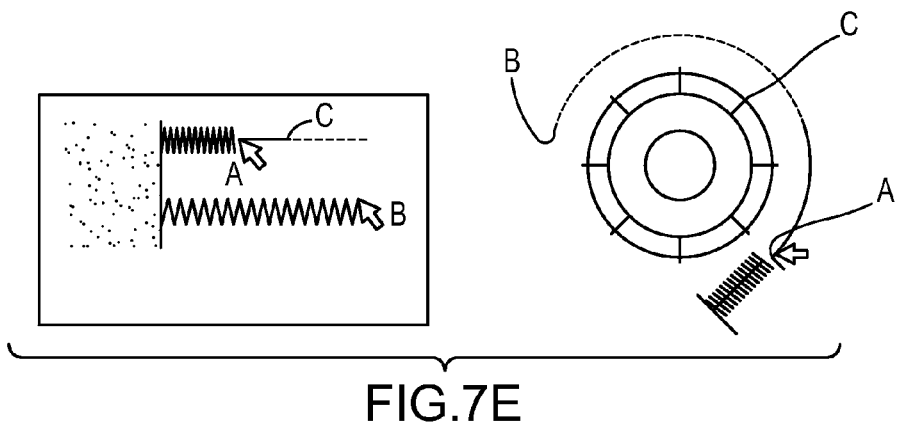

FIG. 7E depicts a programmable spring effect haptic profile in accordance with an embodiment. The spring effect force profile provides a good return-to-default position like that used for shuttle control to regulate speed. The spring effect profile allows the programmable rotary module 12 to place a virtual spring in the knob 20, whereby the programmable rotary module 12 outputs the virtual spring force as the knob 20 is turned. In the example shown in FIG. 7E, the rotary module 12 is programmed by the controller to place a virtual spring at position A on the knob 20. It should be noted, however, that the rotary module 12 may be programmed to place one or more virtual springs anywhere on the movement path of the knob 20. As the knob 20 is sensed being rotated toward position A in FIG. 7E, position signals are sent to the controller 28, whereby appropriate output haptic signals are transmitted to the rotary module 12 to cause the actuator 22 to generate a gradual resistive force to the knob 20. As the movement of the knob 20 approaches position A, the resistive force applied to the knob 20 will approach infinity such that the user is no longer able to rotate the knob 20. If the user releases the knob 20, the force exerted by the actuator 22 will cause the knob 20 to spring back to its default position (shown as "C"). In contrast, the spring force exerted by the actuator 20 will act in the opposite manner than that discussed above as the knob 20 is moved toward position B, as shown in FIG. 7E. Once the user releases the knob 20, the actuator 22 will cause the knob 20 to spring back to default position C.

Figure 7F:
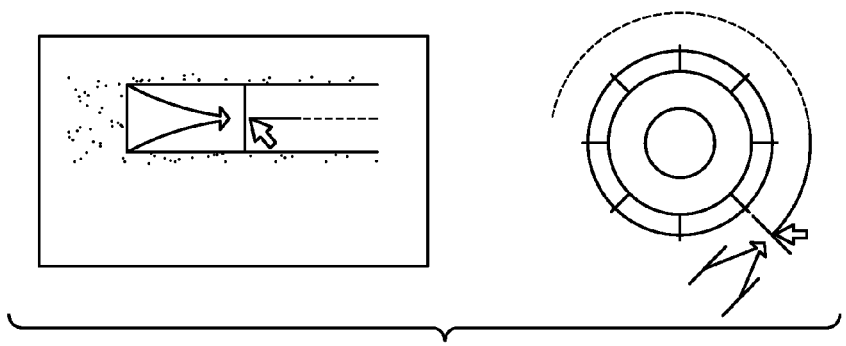

FIG. 7F depicts a damper effect force profile in accordance with an embodiment. A damper effect is a force that increases or decreases with controller speed. Damper effects create the sensation of drag or weight and may be used to emulate the feel of high-quality controls such as those found on expensive audio equipment. A damper effect might also emulate a jog control used to move through, music tracks, menu items, video frames or data stacks. The damping force may be used to slow the knob down or provide feedback to the user that the knob is near the end selection on a menu list. The controller 28 receives sensed velocity and/or acceleration information of the knob 20 as it is rotated, whereby the controller 28 provides the appropriate output signal to the actuator 22 to output the damping haptic effect to the knob 20 based on the sensed information.

Figure 7G:
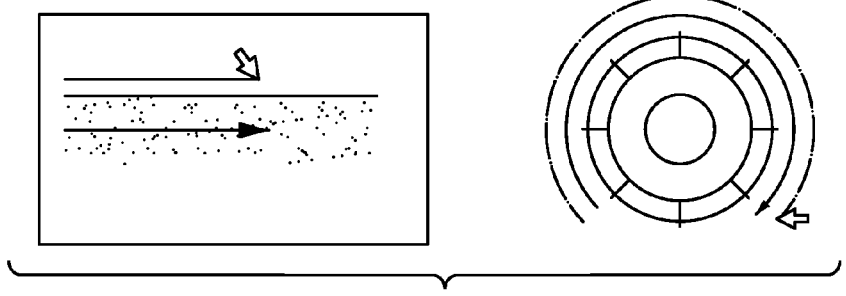

FIG. 7G depicts a constant force effect profile in accordance with an embodiment. A constant force effect is a continuous force independent of the instantaneous position of the knob 20. In other words, the force applied by the actuator does not necessarily change as the knob 20 is rotated toward or away from a certain position, such as spring force of damping force effects. However, in an embodiment, the constant force effect may be activated and thus output by the actuator 22 based on the knob 20 reaching a designated position or when the knob 20 selects a particular item or function on the graphical user interface. The constant force profile may be used by the device 8 to simulate dynamics such as gravity, friction or momentum. The controller 28 sends a constant force output signal to the actuator 22 when the knob 20 is sensed to be at a designated position or when a particular item on a menu or other component is selected by the user.

Figure 7H:
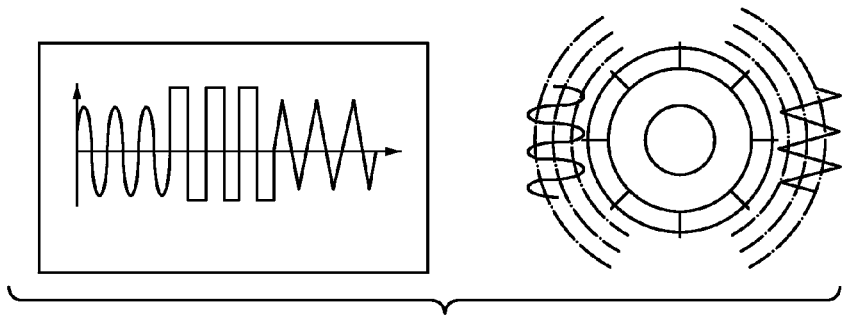

FIG. 7H depicts a periodic force effect profile in accordance with an embodiment. A periodic force effect is a vibration lasting for a set period of time, whereby the vibration has a sine, square, or triangular wave characteristic. In an embodiment, the wave characteristics of the vibration are randomly generated. The periodic force effect profile signal may be output by the controller 28 upon the controller 28 receiving sensed position information that the knob 20 has reached a certain position or when a specific situation is encountered.

Figure 8:
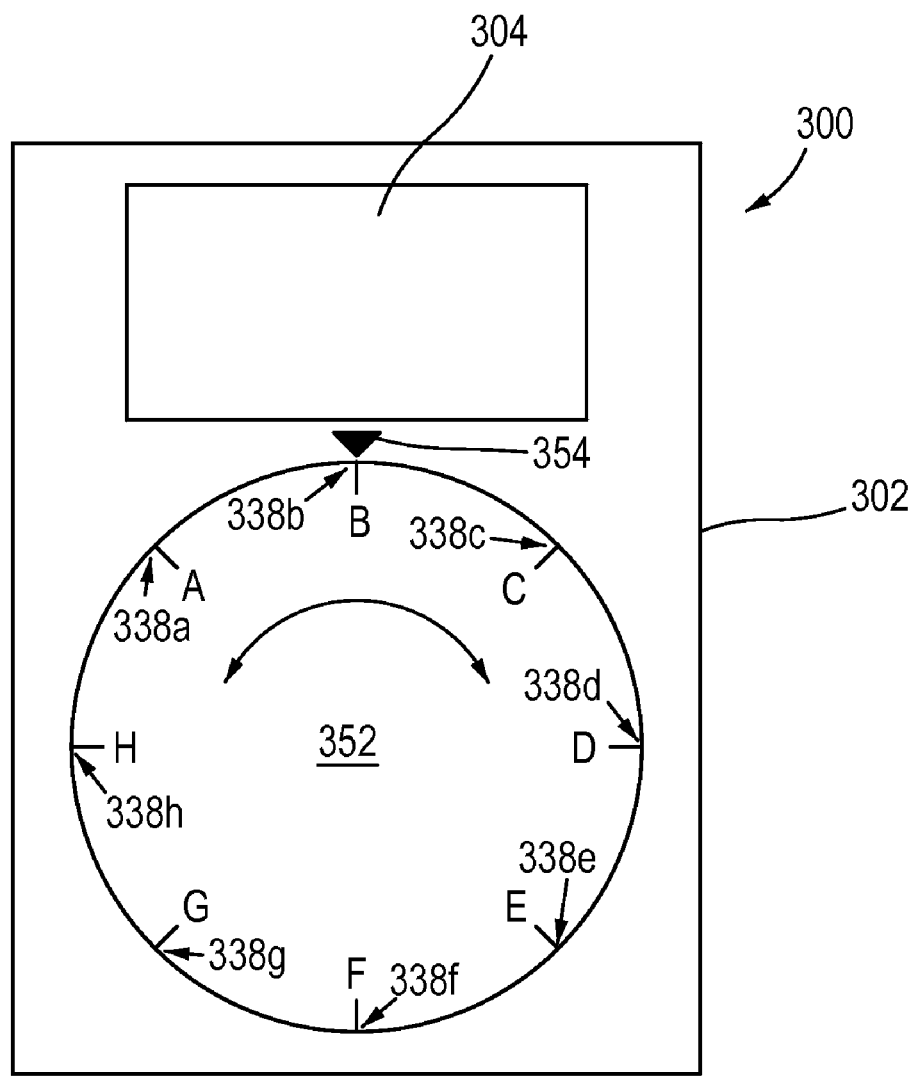
FIG. 8 illustrates a top plan view of a rotary input control device incorporating a type of mechanical haptic assembly in accordance with an embodiment.

FIG. 8 is a top plan view of a rotary input control device incorporating a mechanical haptic in accordance with an embodiment. The device 300 in FIG. 8 is a media device which includes a body 302 having a graphical user interface screen 304 as well as a menu item selection device 352. The menu item selection device 352 is referred to in this example as a knob 352, although the selection device 352 may have any design other than a physical knob 20. The control device 300 shown in FIG. 8 includes mechanical detents 338*a*-338*f* to indicate to a user that she has positioned the knob 352 to one of eight available music tracks A-H in the media device 300. In addition, programmable electronic-based haptics may provide additional haptic effects to the user when turning the knob 52 either clockwise or counterclockwise with respect to a particular selected track.

In another example, a pointer 354 is shown in FIG. 8 pointing toward position indicator "B." As the knob 352 rotates, a sensor within the device 300 detects a change in the radial position of the knob 352. The controller 28 is provided such positional information and, based on such received information as well as the software program upon which the controller 28 is operating, outputs a corresponding effect signal to an actuator in the device 300. In an embodiment, the effect signal causes the actuator to increase the amount of force required by the user to turn the knob 352 and move to the adjacent detent position ("A" or "C" in FIG. 8). The effect signal may also cause an audio transducer to play a sound effect to the user that corresponds to the knob 352 being rotated from one detent to another. In an embodiment, the sensor may detect a torque or speed at which knob 352 is rotated. Controller 28 and actuator 22 may, in turn, provide variable resistance to the knob 352 so that the knob 352 outputs an appropriate haptic effect to the user as the knob 352 is rotated.

Figure 9:
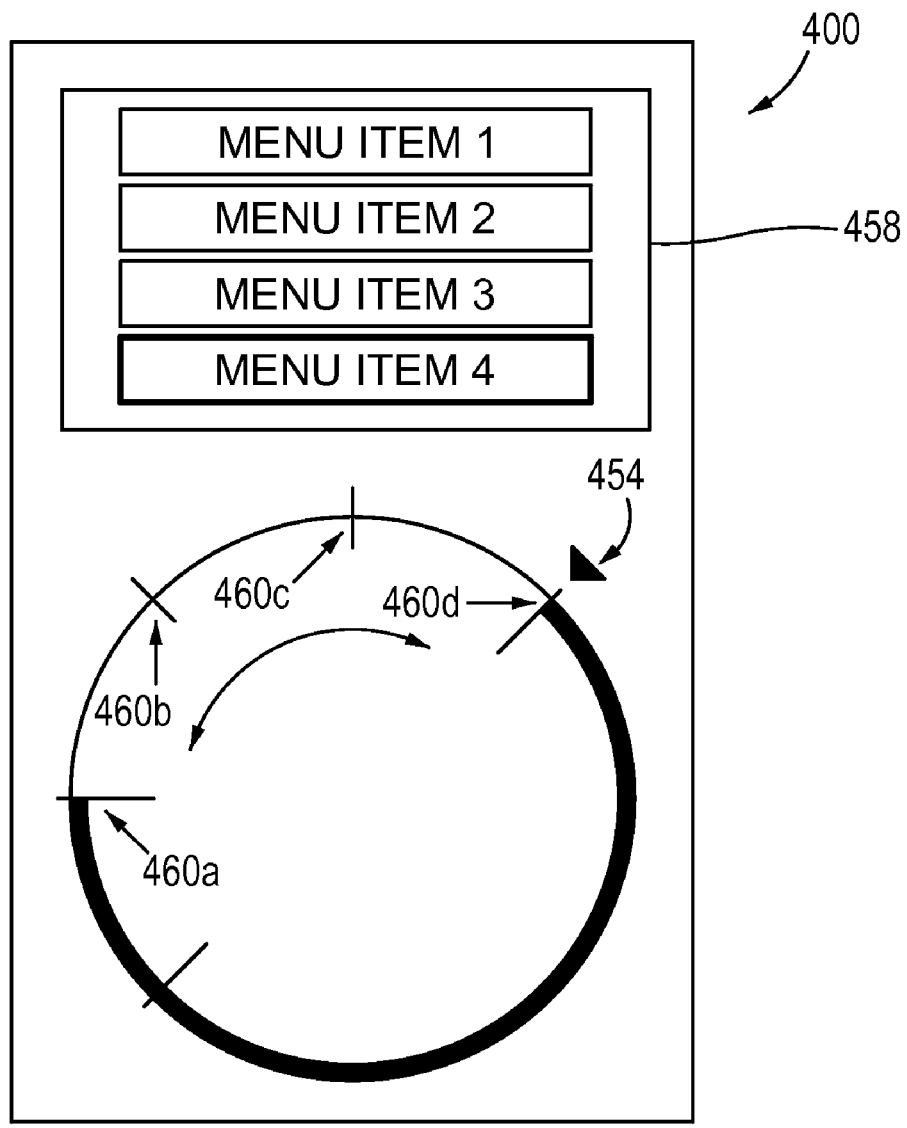
FIG. 9 illustrates a top plan view of a rotary input control device incorporating a hard-stop assembly in accordance with an embodiment.

FIG. 9 is a top plan view of a rotary input control device incorporating a hard-stop assembly in accordance with an embodiment. The rotary input control device 400 shown in FIG. 9 illustrates an application where programmable hard stops 460*a* & 460*d* may be created to separate a number of mechanically-based detents to correspond with a user-interface. For example, consider a system where a user interface is a display screen 458 having a menu. Screen 458 displays four menu items 60*a*, 60*b*, 60*c*, 60*d* and programmable hard stops 460*a*, 460*d* that may be used to frame four of the available mechanical detents to correspond to the four menu items. The programmable hard stops 460*a*, 460*d* allow a user to feel the top and the bottom of the menu without looking at the screen 458. In other words, in the application of the media player described above, although more than four mechanical-based detents may be available on the knob 454, the rotary module in the device 400 may be programmed to output electronic-based hard stop based on the number of items (e.g. music tracks) to be selected from.

Audible sounds may be also generated when the top and/or bottom of the menu or each detent is reached. For example, the sound effects may be output by a voice synthesizer synthesizing a voice associated with some or all detents such as "high," "medium," "low" and "off" or the like. Alternatively mechanical hard stops may be used to indicate the top and bottom of the menu while programmable detents are used to correspond to the four menu items 460*a*, 460*b*, 460*c*, 460*d*.

Figure 10:
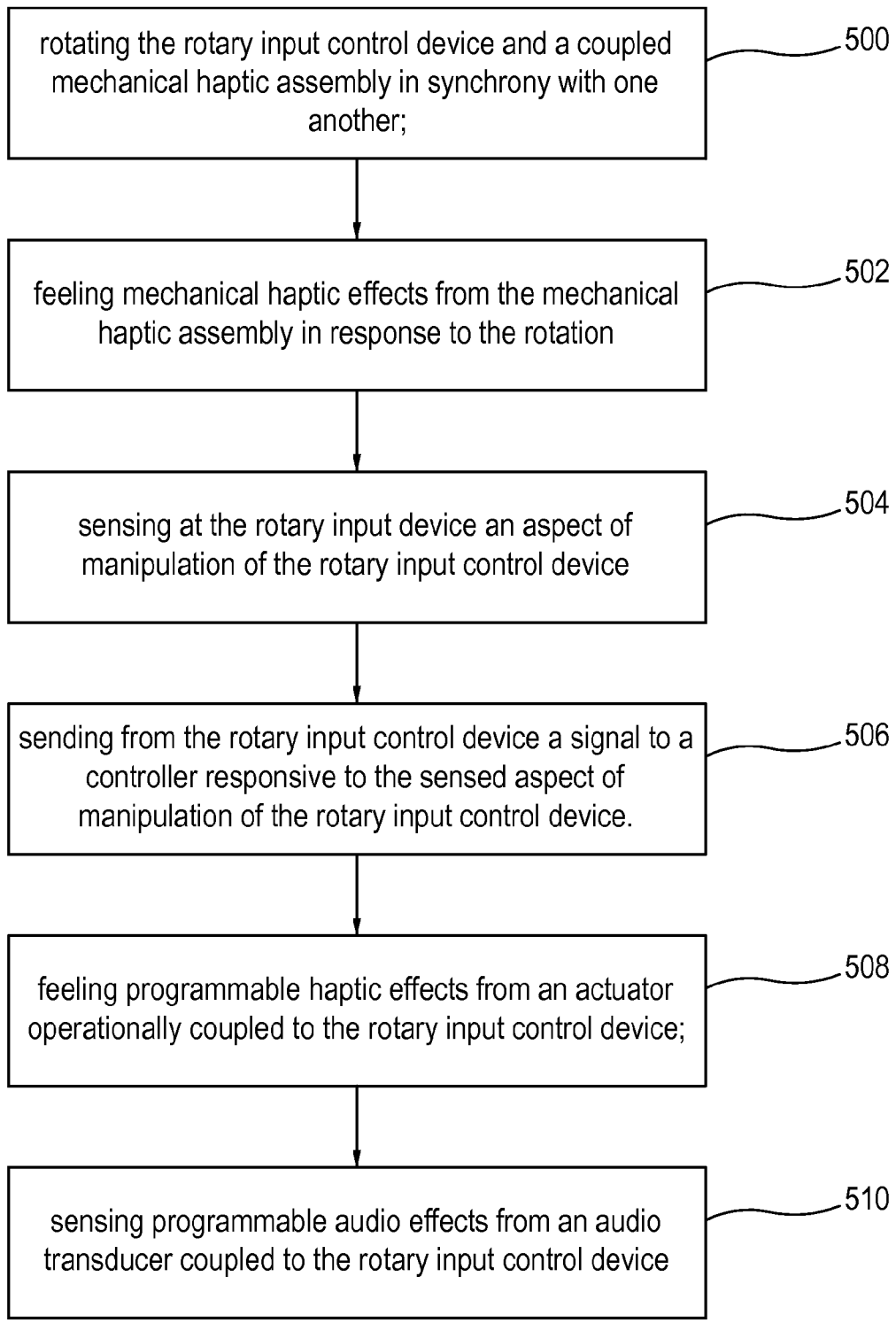
FIG. 10 illustrates a method for interacting with a rotary input control device in accordance with an embodiment.

FIG. 10 is a flow chart for a method for interacting with a rotary input control device in accordance with an embodiment. At block 500, a user rotates or linearly actuates a rotary knob of the rotary input control device whereby a coupled mechanical haptic assembly is rotated in synchrony with the knob. In response to the user rotating the knob, the mechanical haptic assembly generates mechanical haptic effects (502). As the knob is rotated, one or more sensors in the mechanical haptic assembly and/or programmable rotary module measures movement of the knob (504). The one or more sensors send signals to the controller in response to the manipulation of the knob (506). The controller, in response to the signals provided by the sensor as well as the application program running in the controller, outputs haptic signals to the device. The actuator, upon receiving the haptic signals from the controller generates the haptic effect to the knob (508). Optionally, the method may further comprise generating programmable audio effects from an audio transducer coupled to the knob (510).

The subject matter described herein may be implemented in a number of ways where rotary controls are used. Take for example, a control panel in a car where rotary controls may be used to adjust volume for a stereo, climate control, i.e., temperature, defroster settings, fan settings, mirrors, seat adjustments, windshield wiper speeds, alarm setting, clocks, and to navigate the interface of a global positioning system. Other examples of rotary controls include vending machines, audio/video equipment, cameras, etc. It should be noted that a computer, processor, or other computing device may be coupled to the device described above, whereby the computer operates a software program which receives signals from the device and outputs signals to the device which provides haptic sensations to the user.

The present invention provides several advantages over the prior art. Real mechanical detents create high quality feel and a high level of realism that may be built upon, rather than having to re-create them electronically. Programmable haptic effects are dynamic, allowing quick alterations without having to re-manufacture mechanical assemblies. They may be used to alter, fine-tune, and complement existing mechanical detent assemblies, allowing designers versatility in providing the desired haptic effects. Moreover, the subject matter described herein will simplify position-sensing by taking advantage of mechanical detents or mechanical hard stops as reference points. These reference points may minimize the sampling rates required. Set reference points may also aid in the synchronization of haptic effects with audio effects. Furthermore, the device described herein will always have a default feel even when un-powered.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A rotary input control device, comprising:
    a rotatable shaft;
    a manipulandum coupled to the shaft;
    a mechanical haptic assembly coupled to the manipulandum and configured to generate one or more mechanical haptic effects in response to rotation of the manipulandum;
    a sensor configured to measure manipulation of the manipulandum and to output manipulation information;
    a controller coupled to the sensor and configured to receive manipulation information and mechanical haptic assembly information and output a haptic output signal based at least in part on the mechanical haptic assembly information; and
    an actuator operationally coupled to the manipulandum and the controller and responsive to the haptic output signal to provide a programmable haptic effect in response to rotation of the manipulandum;
    wherein the mechanical haptic assembly comprises a plurality of mechanical detents and the mechanical haptic assembly information comprises at least one of: a number of the mechanical detents, a width of the mechanical detents, or a location of the center of the mechanical detents;
    wherein the controller generates the haptic output signal using at least an algorithm, and the mechanical haptic assembly information is provided as an input to the algorithm;
    wherein the actuator overlays the programmable haptic effect onto the one or more mechanical haptic effects based on at least one programmable haptic effect profile; and
    wherein the controller is further configured to output an output signal to turn off the programmable haptic effect, wherein the one or more mechanical haptic effects are generated in response to rotation of the manipulandum.

2. The rotary input control device of claim 1, further comprising:
    an audio transducer;
    wherein the controller is configured to output an audio signal to the audio transducer in response to rotation of the manipulandum.

3. The rotary input control device of claim 1, wherein the mechanical haptic assembly includes a mechanical hard stop.

4. The rotary input control device of claim 1, further comprising an electromechanical switch that allows rotation of the manipulandum without generating mechanical haptic effects.

5. The rotary input control device of claim 1, wherein the sensor is configured to measure a speed at which the manipulandum is rotated.

6. The rotary input control device of claim 1, wherein the sensor is configured to measure detection of a radial position of at least a portion of a mechanical detent.

7. The rotary input control device of claim 1, wherein the controller is configured to generate the haptic output signal while the manipulandum is at a rest position of a detent.

8. The rotary input control device of claim 1, wherein the controller is configured to generate the haptic output signal while the mechanical haptic assembly is captured at a specific detent and wherein the haptic output signal is responsive, at least in part, to the specific detent in which the mechanical haptic assembly is captured.

9. The rotary input control device of claim 1, wherein the programmable haptic effect is a resistive force feedback.

10. The rotary input control device of claim 1, wherein the programmable haptic effect is an active force feedback.

11. The rotary input control device of claim 1, wherein the haptic output signal serves to create at least one hard stop.

12. The rotary input control device of claim 1, wherein the haptic output signal serves to create a hard stop to separate a number of mechanical detents according to a state of a user interface at a given time.

13. The rotary input control device of claim 1, wherein:
    the controller is configured to output an audio signal to an audio transducer in response to the manipulandum entering a detent.

14. A method for interacting with a rotary input control device, the method comprising:
    rotating a knob and a coupled mechanical haptic assembly in synchrony with one another;
    generating mechanical haptic effects from the mechanical haptic assembly in response to the rotation;
    sensing by a sensor manipulation of the rotary input control device;
    outputting a haptic output signal from a controller coupled to the sensor, the haptic output signal based at least in part on the sensor output and mechanical haptic assembly information; and
    generating one or more programmable haptic effects from an actuator operationally coupled to the rotary input control device and responsive to the haptic output signal;
    wherein the mechanical haptic assembly comprises a plurality of mechanical detents and the mechanical haptic assembly information comprises at least one of: a number of the mechanical detents, a width of the mechanical detents, or a location of the center of the mechanical detents;
    wherein the controller generates the haptic output signal using at least an algorithm, and the mechanical haptic assembly information is provided as an input to the algorithm;
    wherein the actuator overlays the one or more programmable haptic effects onto the one or more mechanical haptic effects based on at least one programmable haptic effect profile; and wherein the controller further outputs an output signal to turn off the programmable haptic effect, wherein the one or more mechanical haptic effects are generated in response to rotation.

15. The method of claim 14 further comprising:

generating programmable audio effects from an audio transducer coupled to the rotary input control device.

16. The method of claim 14, further comprising:

generating mechanical detents by rotation of the mechanical haptic assembly.

17. The method of claim 14, wherein the mechanical haptic assembly is configured to create a hard stop with the rotation.

18. The method of claim 14, wherein the sensing includes a rotary position attained by the manipulandum.

19. The method of claim 14, wherein the sensing includes a speed at which the manipulandum is rotated.

20. The rotary input control device of claim 1, wherein the algorithm comprises a look-up table.

21. The method of claim 14, wherein the algorithm comprises a look-up table.

* * * * *